United States Patent Office 3,332,972
Patented July 25, 1967

3,332,972
METHYL PHENYL CYCLOSILOXANES
John F. Brown, Jr., Schenectady, N.Y., assignor to General Electric Company, a corporation of New York
No Drawing. Filed May 21, 1962, Ser. No. 196,519
3 Claims. (Cl. 260—448.2)

This invention is concerned with novel, cyclic polysiloxanes having the formula:

I 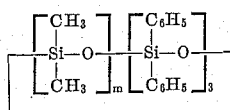

where $m$ is a whole number from 2 to 3, inclusive.

Cyclic polysiloxanes, particularly cyclic polydimethylsiloxanes, are known in the art and have been used for preparing high molecular polymers by reaction of these cyclic polysiloxanes with an organopolysiloxane rearrangement and condensation catalyst such as, for example, potassium hydroxide, cesium hydroxide, etc. The resulting polydimethylsiloxanes have been found to be useful in various applications and particularly in the preparation of cured organopolysiloxane rubbers which have been found to be highly resistant to elevated temperatures and to be flexible at low temperatures. However, these polydimethylsiloxanes, in addition to having low tensile strengths in the unfilled, cured state, are not sufficiently resistant to ionizing radiation as, for instance, they do not have the desired radiation resistance when used in environments being subjected to bombardment by high energy electrons as might be encountered in an atomic pile.

Attempts to substitute some of the silicon-bonded methyl groups by silicon-bonded phenyl groups in the polymeric chain have not been too readily accomplished because prior art methods for making these methylphenylpolysiloxane polymers have resulted in hard, intractible materials (especially those with high phenyl content) which make them of limited use as flexible silicone rubbers.

The above-identified compositions identified by Formula I can, however, be converted to methylphenylpolysiloxane rubbers which, contrary to the usual methyl phenylpolysiloxane rubbers containing a major proportion of phenyl groups which are made from the heretofore known cyclic methylpolysiloxanes and cyclic phenylpolysiloxanes, are quite flexible and have good tensile strength and elongation in the cured state. The incorporation of various fillers, particularly reinforcing fillers such as carbon black, fume silica, silica aerogel, etc., even further improves the strength of these rubbers over and above that which is normally encountered in the usual methylphenylpolysiloxane rubbers. The ability to form these new polymers is the direct result of using as the starting cyclic methylphenylpolysiloxane, compositions of Formula I.

The organopolysiloxane rubbers made from the cyclic methylphenylpolysiloxanes of the present invention, because of their high temperature resistance are useful as insulation for electrical conductors and as dielectric materials in all applications requiring this resistance to elevated temperatures. In addition, the cyclic materials can be dissolved in solvents such as benzene, toluene, etc., and used to coat various reinforcing fillers such as the above-mentioned fume silica, silica aerogel, etc., which in turn can be used as fillers for the usual organopolysiloxane rubbers. In the absence of such treatment of the fillers, upon standing, the filled rubber compound (prior to vulcanization) tends to become nervy and rubbery rendering it difficult to compound at a later date, after standing around with the other additives necessary for effecting cure of the silicone rubber, namely, a curing agent such as benzoyl peroxide, dicumyl peroxide, etc.

The compositions of Formula I recited above can be prepared by effecting reaction between hexaphenyltrisiloxane-1,5-diol (which can be prepared in accordance with the procedures shown in U.S. Patents 2,607,792 and 2,843,555), and either 1,3-dichlorotetramethyldisiloxane or 1,5-dichlorohexamethyltrisiloxane (which can be prepared in accordance with the procedures shown in U.S. Patents 2,381,366, 2,629,726 and 2,902,507). The reaction generally involves 1 mole of the diol per mole of the dichlorosiloxane. The result of the reaction is to split out two moles of hydrogen chloride with the concurrent formation of the siloxane linkages present in the claimed compositions of Formula I. Generally, in order to hasten the reaction, it is desirable to employ a hydrogen halide acceptor, for instance, pyridine, organic tertiary amines such as triethyl amine, N,N-dimethylaniline, etc. Preferably the hydrogen halide acceptor is employed in excess, there being about 2.2 to 10 moles of the acceptor per mole of whichever of the other two reactants is present in the smaller amount, it being understood that one can employ from about 0.5 to 2 moles of the chloromethylsiloxane per mole of the diol.

Because the diol and the resulting cyclic polysiloxanes are solids at room temperatures, it is usually desirable to effect the reaction in the presence of a solvent for both the diol and the reaction product, the said solvent advantageously being inert to the reactants and to the reaction products under the conditions of reaction. Suitable solvents include diethyl ether, tetrahydrofuran, tetrahydropyran, xylene, toluene, benzene, etc. Generally the solvents are present in a weight ratio of from about 1 to 50 parts thereof per part of the total weight of the components undergoing reaction.

Generally, room temperatures (about 20–30° C.) are usually the only temperature required, although higher temperatures are not precluded. The time of reaction can vary widely and depending upon the temperature, the reactants employed, the proportion of ingredients, etc., times of the order of from about 1 minute to 12 hours or more are generally sufficient to complete the reaction. After the reaction is completed, the usual techniques for isolating the desired product are employed.

In order that those skilled in the art may better understand how the present invention may be practiced, the following examples are given by way of illustration and not by way of limitation.

EXAMPLE 1

To a stirred reaction mixture of 15 grams of hexaphenyltrisiloxane-1,5-diol and 3.9 grams of pyridine in 200 ml. anhydrous ethyl ether was added 5 grams of 1,3-dichlorotetramethyldisiloxane in 25 ml. of anhydrous ethyl ether over a period of 45 minutes. Stirring was continued for 2 hours. Thereafter the solution was filtered to remove the pyridine hydrochloride formed and the ethereal filtrate was evaporated to yield a solid material. This solid material was dissolved in hot n-hexane and filtered to remove the unreacted diol. The hexane was evaporated and the solid crystallized from n-propanol and finally from n-hexane to yield 1,1,3,3-tetramethyl-5,5,7,7,9,9-hexaphenyl-cyclopentasiloxane having the formula II 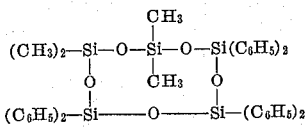

This composition melted at 93–94° C. Analysis of the composition showed it to contain 64.8% carbon and 55.8% hydrogen as contrasted to the theoretical values of 64.7% carbon and 5.7% hydrogen. It was quite surprising to find that the melting point of this composition was below that of the lower cyclic polymer 1,1-dimethyl-3,3,5,5,7,7-hexaphenylcyclotetrasiloxane which has a melting point of 115–116° C. as is more particularly disclosed and claimed in the copending application of Howard A. Vaughn, Jr., Ser. No. 160,267, filed Dec. 18, 1961, now abandoned, and assigned to the same assignee as the present invention.

EXAMPLE 2

This example illustrates the preparation of the composition 1,1,3,3,5,5-hexamethyl-7,7,9,9,11,11-hexaphenylcyclohexasiloxane having the formula III
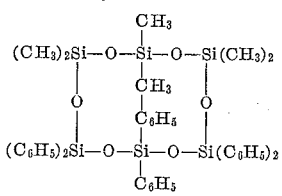

More particularly, to a stirred mixture of 15 grams of hexaphenyltrisiloxane-1,5-diol and 7 grams of 1,5-dichlorohexamethyltrisiloxane in 200 ml. of anhydrous ethyl ether was rapidly added 4.2 grams of pyridine in 10 ml. of anhydrous ether. Stirring was continued for 1.5 hours. Thereafter, the solution was filtered to remove the pyridine hydrochloride and the ethereal filtrate was washed with water. The ether was evaporated to yield an oil-crystal mixture which was extracted with ethanol. The crystals from the ethanol extract were dissolved in n-hexane to remove any cyclic trimer and diol. The hexane was evaporated and the above-identified composition of Formula III crystallized from methanol as a solid having a melting point of 215–215.5° C. Analysis of this composition showed it to contain 61.4% carbon and 6.1% hydrogen as contrasted to the theoretical values of 61.8% carbon and 5.9% hydrogen.

EXAMPLE 3

The composition of Formula II was polymerized as follows. Four grams of this cyclic composition were placed in a reaction vessel, and $3.7 \times 10^{-6}$ moles of potassium hydroxide (a 1% dispersion in octamethylcyclotetrasiloxane) was added. The reaction vessel was evacuated at a pressure of $10^{-4}$ mm., the contents melted and degassed, and the vessel sealed under vacuum. The reaction mixture was then placed in a 110° C. oven for 22 hours. The reaction mixture was cooled, the reaction vessel opened and a small amount of methyl iodide was added to quench the catalyst. The product was twice dissolved in 25 ml. benzene and precipitated into 250 ml. methanol. This methanol-insoluble polymer had an intrinsic viscosity in benzene of 2.38 deciliters per gram at 25° C. A film of this polymer was subjected to 800 kv. peak electrons and irradiated to a dose of $50 \times 10^6$ roentgens (as shown in Lawton et al. patent U.S. 2,763,609). The irradiated film had a tensile strength of 264 p.s.i. and an elongation of 157% at an elongation rate of 2 inches/minute. This composition also surprisingly exhibited the property of being flexible and elastic at 0° C.

EXAMPLE 4

The composition having the Formula III was polymerized as follows: 4 grams of this material was placed in a 50 ml. flask and about 25 ml. of dry n-hexane was added under vacuum. The hexane solution was frozen and the flask sealed. Attached to the flask via a break-seal was a long tube connected to a reaction vessel and containing a packing of calcium hydride. This assembly was evacuated to $10^{-5}$ mm. and the seal broken so as to allow the hexane solution to flow over the calcium hydride into the reaction vessel. Then the solution was frozen and the tube containing the hydride sealed off. Next, a dispersion of $3.7 \times 10^{-6}$ moles of potassium hydroxide (1% dispersion in octamethylcyclotetrasiloxane) was added to the hexane solution under nitrogen. The assembly was re-evacuated, the hexane was flashed off and at a pressure of $10^{-5}$ mm. the reaction vessel was sealed off and placed in a 210° C. oven for 25 hours. The reaction vessel was then cooled, opened, and a small amount of methyl iodide added to quench the catalyst. The product was dissolved three times in 25 ml. of benzene and precipitated into 250 ml. methanol. The polymer was a gum at room temperature which resembled polydimethylsiloxane gum in slowly flowing under its own weight.

What I claim as new and desire to secure by Letters Patent of the United States is:

1. A composition of matter selected from the class consisting of the composition 1,1,3,3-tetramethyl-5,5,7,7,9,9-hexaphenylcyclopentasiloxane having the formula

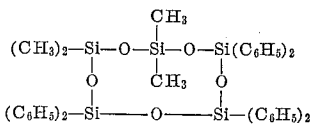

and the composition 1,1,3,3,5,5-hexamethyl-7,7,9,9,11,11-hexaphenylcyclohexasiloxane having the formula

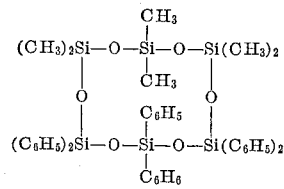

2. The composition 1,1,3,3-tetramethyl-5,5,7,7,9,9-hexaphenylcyclopentasiloxane having the formula

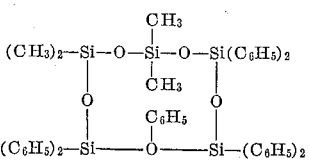

3. The composition 1,1,3,3,5,5,-hexamethyl-7,7,9,9,11,11-hexaphenylcyclohexasiloxane having the formula

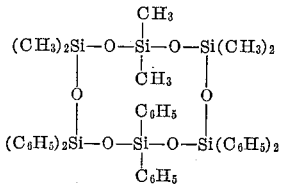

References Cited

UNITED STATES PATENTS

| | | | |
|---|---|---|---|
| 2,605,274 | 7/1952 | Tyler | 260—448.2 |
| 2,890,234 | 6/1959 | Fletcher et al. | 260—448.2 |
| 2,970,126 | 1/1961 | Brown | 260—448.2 |
| 3,037,962 | 6/1962 | Hartung et al. | 260—448.2 |
| 3,105,061 | 9/1963 | Bruner | 260—448.2 |

TOBIAS E. LEVOW, *Primary Examiner.*

SAMUEL BLECH, *Examiner.*

J. G. LEVITT, P. F. SHAVER, *Assistant Examiners.*